A. A. SCHNEIDER.
MOTOR VEHICLE.
APPLICATION FILED NOV. 15, 1918.
1,358,252.
Patented Nov. 9, 1920.
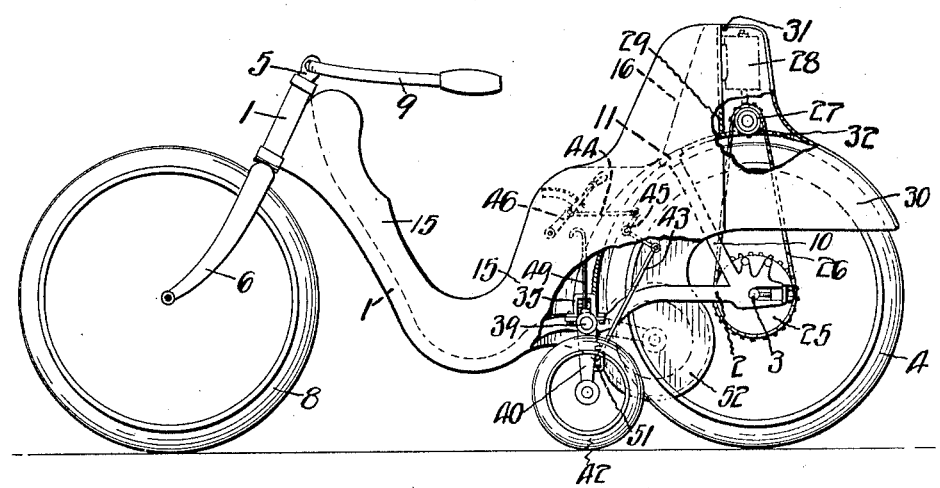
Fig. 1.
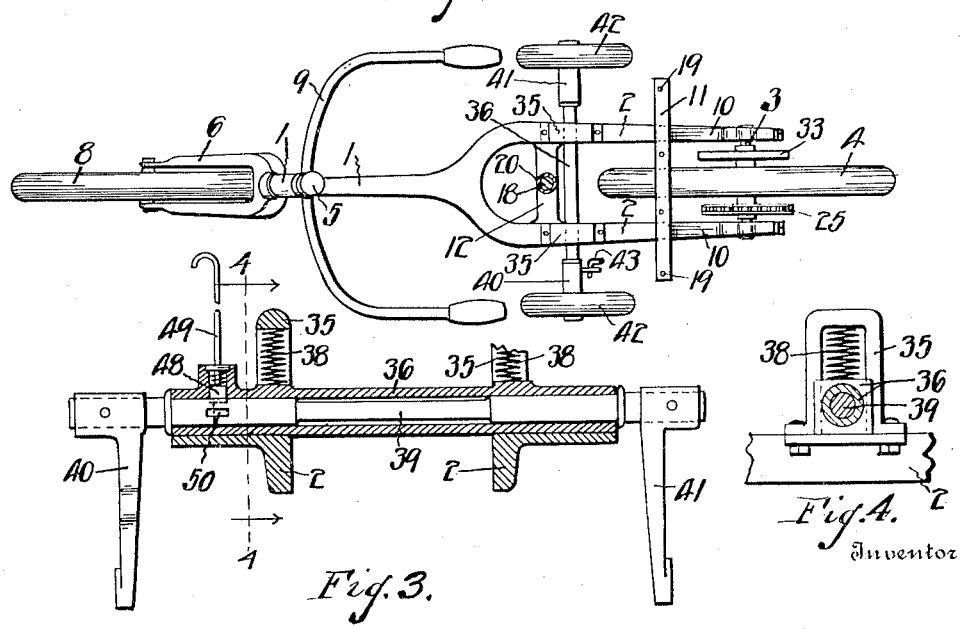
Inventor
Arnold A. Schneider

UNITED STATES PATENT OFFICE.

ARNOLD A. SCHNEIDER, OF DETROIT, MICHIGAN.

MOTOR-VEHICLE.

1,358,252.  Specification of Letters Patent.  Patented Nov. 9, 1920.

Application filed November 15, 1918. Serial No. 262,699.

*To all whom it may concern:*

Be it known that I, ARNOLD A. SCHNEIDER, a citizen of Switzerland, and residing at Detroit, in the county of Wayne and State of Michigan, have invented a new and Improved Motor-Vehicle, of which the following is a specification.

It is customary to provide motorcycles with side attachments consisting of a one-wheeled seated frame whereon the extra passenger or passengers are carried, but the vehicle so formed is unsightly, can be steered only with difficulty, and is objectionable for other reasons. The present invention relates to a vehicle which is also intended for light service, but which both avoids the objections referred to and is advantageous otherwise.

More particularly, it consists in a vehicle comprising a central frame and two wheels arranged with reference to each other in substantially the same manner as are those of the ordinary motorcycle or bicycle, together with a pair of relatively small spring supported wheels spaced laterally from and preferably forwardly of the driving wheel, whereby proper lateral support is insured.

The invention further consists in a vehicle of this nature wherein the lateral wheels may be elevated from or lowered to the ground by the driver while sitting in the seat, whereby the machine may be driven in substantially the same manner as the ordinary motorcycle, if desired, or after speed is attained.

The invention also consists in various other details of construction and arrangements of parts hereinafter pointed out.

In the drawings, Figure 1 is a side elevation, parts being broken away, showing a preferred embodiment of the invention. Fig. 2 is a plan view, the body being removed. Fig. 3 is a fragmentary vertical section more clearly showing the manner of supporting the auxiliary wheels. Fig. 4 is a section on line 4—4 of Fig. 3.

The frame 1, which may be made in one piece, is somewhat similar to that of a well known type of bicycle, being divided at the rear to form two arms 2, spaced considerably from one another, between which the axle 3 of the wheel 4 is adjustably mounted in any suitable manner. At its forward end, the frame rises to receive the steering post 5 between the forks 6 of which the wheel 8 is positioned in the ordinary way. Handle bars 9 or any other desired means serve for steering purposes.

The frame also preferably includes the upwardly and forwardly inclined elements 10 which are joined at their tops by a cross-bar 11 that may project laterally beyond the arms 2 as indicated in Fig. 2. The arms may be joined rearwardly of the fork by the cross bar 12. Considerable variation may be exercised in positioning the several parts of the frame; however, it in any event forms a rather broad support for a body 15 which is preferably of sheet metal and wide enough to accommodate two or more persons on the upholstered seat 16 thereof, it being understood that the body narrows in graceful lines from the foot space forwardly. The body may be secured to the frame as by means of the bolt 18 that passes through the cross bar 12, and other bolts the holes for which appear at 19, and, to avoid rattling, rubber gaskets or blocks, one of which is indicated at 20, may be interposed.

The vehicle may be propelled by any suitable means, such as the sprocket wheel 25, the chain 26, the sprocket wheel 27 and the engine 28, the latter being mounted on the rear wall or back 29 of the body or elsewhere. In order to permit access to the engine and associated parts a sheet metal hood 30 is provided, it being so arranged as to swing upwardly about the horizontal pivot 31; and the mud is kept off the engine by the plate or guard 32, slotted to permit passage of the chain and formed rigidly with the body structure.

A suitable brake is conventionally shown at 33, (Fig. 2); it may be operated from the seat by any suitable means, not shown.

Mounted on the frame just forwardly of the wheel 4 are a pair of housings 35 in which a non-rotatable tubular member or axle bearing 36 is adapted to rise and fall in association with the springs 38; and extending through the bearings is an axle 39 which has rigid therewith posts or arms 40—41 on the ends of which the small auxiliary wheels 42 are carried for lateral support. In the vehicle shown, the axle is swingable in the bearing to carry the wheels 42 from the full-line position to that shown in dotted lines (Fig. 1), and mechanism, one embodiment of which consists in the links 43, 44, the bell crank 45 and the hand lever 46, is provided for operating the axle from the seat. A spring pressed latch 48, the operating rod 49 of which extends to the seat, is adapted to be received in either of two notches 50 in the axle to hold the latter at the desired limit of movement. By attaching the link 43 to the arm by a give-and-take connection such as that formed by bending the end of the link over into a slot 51 in the arm 40, it is evident that the necessary freedom for vertical movement of the axle housing in the boxes 35 is permitted.

It will be seen that the body 15, in the embodiment shown, comprises downward extensions 52 whereby the wheels 42 are concealed when in elevated position; these wheels, as well as the wheels 4—8, are equipped with the usual pneumatic tires.

The normal position of the wheels 42, when the vehicle is stationary, is as shown in full lines in Fig. 1, and this position may be maintained under usual running conditions such as in cities and on smooth highways. The bearing 36 then rises and falls in the housing 35 as the various small obstructions or irregularities in the road surface are encountered, and as the vehicle passes around corners or curves, regardless of whether the load is balanced or not, and the necessary freedom for desirable lateral swaying is thus permitted. In case the vehicle has one occupant only or the load is otherwise balanced the wheels 42 may be lifted, especially when it is desired to run at high speed, in which case the vehicle operates substantially the same as an ordinary motorcycle.

This frame and general construction allows the use of a variety of bodies of neat pleasing lines and such as afford both comfort and room to the user, and the whole vehicle may be manufactured and operated at an exceedingly low cost.

Various changes in the construction and arrangement of the several parts, other than those heretofore pointed out, may obviously be made without departing from the spirit of the invention. I do not, therefore, wish to be limited otherwise than indicated by the subjoined claims.

I claim:—

1. In a vehicle comprising a frame, a front wheel and a rear wheel alined with each other in the central longitudinal plane of the vehicle, the front wheel being swingable for steering purposes, a bearing mounted in the frame in a plane transversely to the central longitudinal plane and adapted to have vertical movement, a spring for each end of the bearing adapted to resist said movement, an axle mounted in said bearing, arms on the outer ends of said axle, auxiliary wheels rotatably mounted on the ends of said arms and means to swing said axle to press the auxiliary wheels against the roadway.

2. In a vehicle, the combination of a frame, a front steering wheel and a driven rear wheel on which the frame is mounted, a bearing mounted in the frame in a plane transversely to the plane passing through said front and rear wheels, the ends of said bearing adapted to have vertical movement, a spring for each end of the bearing adapted to resist said movement, an axle mounted in said bearing, arms on the outer ends of said axle, auxiliary wheels mounted on the ends of said arms, and means adapted to be operated by a passenger on the vehicle for turning said axle to elevate said auxiliary wheels while the vehicle is in motion.

3. In a vehicle of the class described, a wheel mounted frame, a bearing mounted in said frame with its ends adapted for vertical movement a spring to resist the vertical movement of each end of the bearing, an axle mounted in said bearing and arms mounted on the ends of said axle, a bracing wheel mounted on the end of each arm, and means for shifting said bracing wheels about said axle from a position in which they contact with the road surface to a position in which they are free and clear therefrom.

4. A vehicle comprising a two wheel frame, said wheels being disposed in alinement with each other longitudinally of the vehicle and the front wheel being steerable, a transverse axle, a bearing therefor mounted in said frame and adapted to move vertically a spring to resist the upward movement of each end of the bearing, arms and wheels on the ends of said axle, means for turning the axle angularly in said bearing from a position in which the auxiliary wheels bear on the road surface to a position in which they are elevated therefrom, and means for holding the axle in either of said positions at will.

5. A vehicle comprising a frame mounted on a front wheel and a rear wheel, said wheels being in alinement longitudinally of the vehicle, the front wheel being steerable, means for driving the rear wheel to propel the vehicle, a bearing mounted in said frame in a plane transversely to the plane of the wheels of the vehicle, the ends of said bearing being adapted for vertical movement, springs to resist said movement, an axle mounted in said bearing and arms on the outer ends of said axle, a pair of relatively small transversely alined auxiliary wheels symmetrically arranged with reference to the longitudinal central vertical plane of the vehicle and mounted on the outer ends of said arms, and means for locking said axle when turned to carry the wheels out of contact with the roadway.

ARNOLD A. SCHNEIDER.